(12) United States Patent
Matsushita et al.

(10) Patent No.: US 8,380,813 B2
(45) Date of Patent: Feb. 19, 2013

(54) NETWORK TERMINAL APPARATUS AND METHOD OF REQUESTING DISTRIBUTION

(75) Inventors: Akifumi Matsushita, Kanagawa (JP); Tomohiro Koyata, Tokyo (JP); Gousuke Izawa, Tokyo (JP)

(73) Assignee: Sony Corporation, Tokyo (JP)

( * ) Notice: Subject to any disclaimer, the term of this patent is extended or adjusted under 35 U.S.C. 154(b) by 119 days.

(21) Appl. No.: 13/037,665

(22) Filed: Mar. 1, 2011

(65) Prior Publication Data

US 2011/0225261 A1   Sep. 15, 2011

(30) Foreign Application Priority Data

Mar. 9, 2010   (JP) .................................. 2010-051739

(51) Int. Cl.
*G06F 15/16*   (2006.01)
(52) U.S. Cl. ........................................ 709/217; 709/218
(58) Field of Classification Search .................. 709/217, 709/218
See application file for complete search history.

(56) References Cited

U.S. PATENT DOCUMENTS 6,951,030 B2 *   9/2005   Hirai et al. ...................... 725/33
7,132,956 B2   11/2006   Haruki

FOREIGN PATENT DOCUMENTS

JP   2000-224673 A   8/2000
JP   2004-228647 A   8/2004

* cited by examiner

*Primary Examiner* — Adnan Mirza
(74) *Attorney, Agent, or Firm* — Wolf, Greenfield & Sacks, P.C.

(57) ABSTRACT

A network terminal apparatus includes: a communication section communicating with a server apparatus communicable through a network; a reproduction section reproducing and outputting content data; a request processing section performing a management structure requesting process for requesting a server apparatus communicable through the communication section to provide management structure information indicating a management structure for distributed content, a content selecting process for selecting an item of content data based on the management structure information acquired by the management structure requesting process, and a content requesting process for requesting a server apparatus identified as a distributor based on the management structure information to distribute the item of content data selected by the content selecting process without intervention of an operation performed by a user; and a reproduction controlling section causing the reproduction section to reproduce the item of content data transmitted from the server apparatus according to the content requesting process.

12 Claims, 10 Drawing Sheets

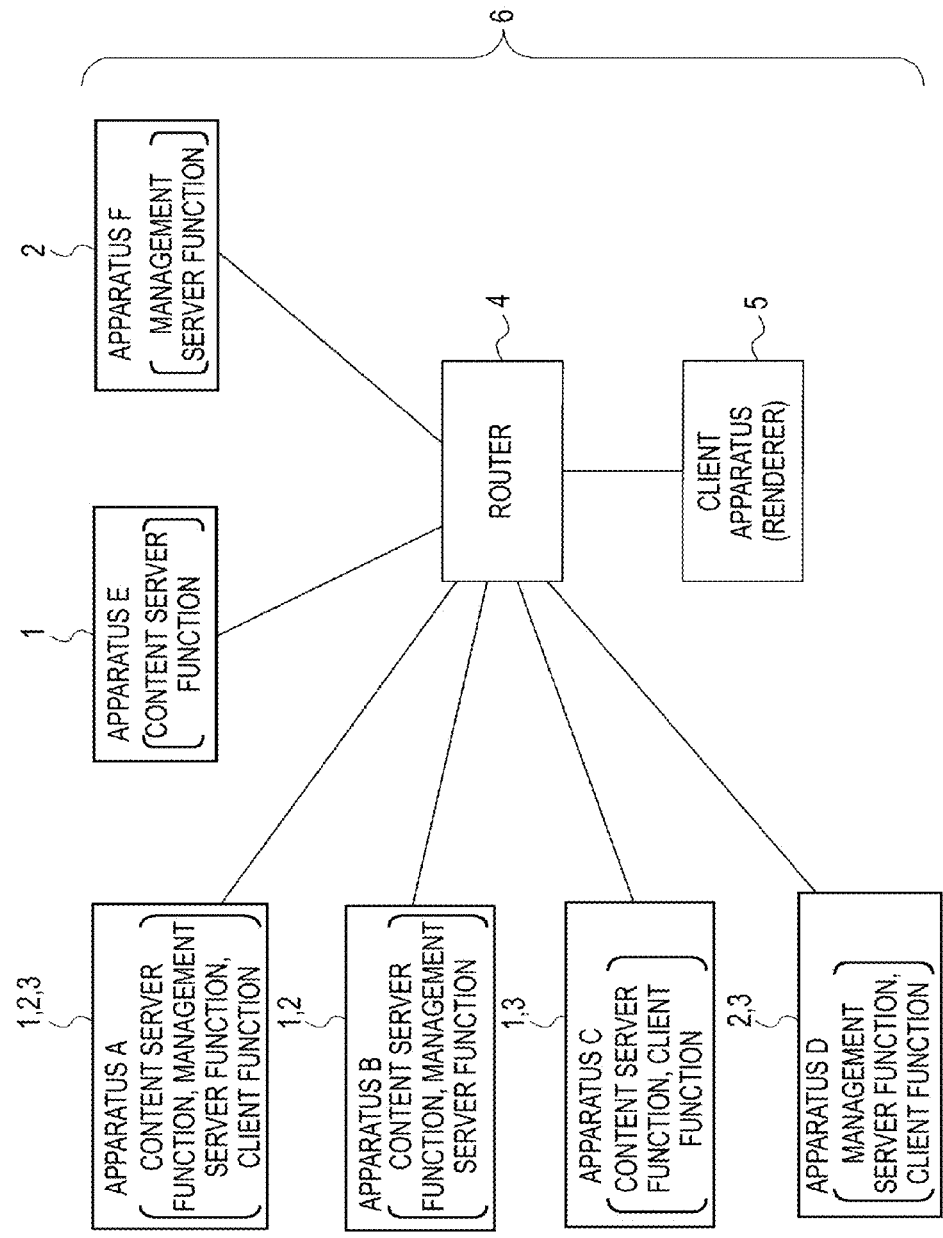

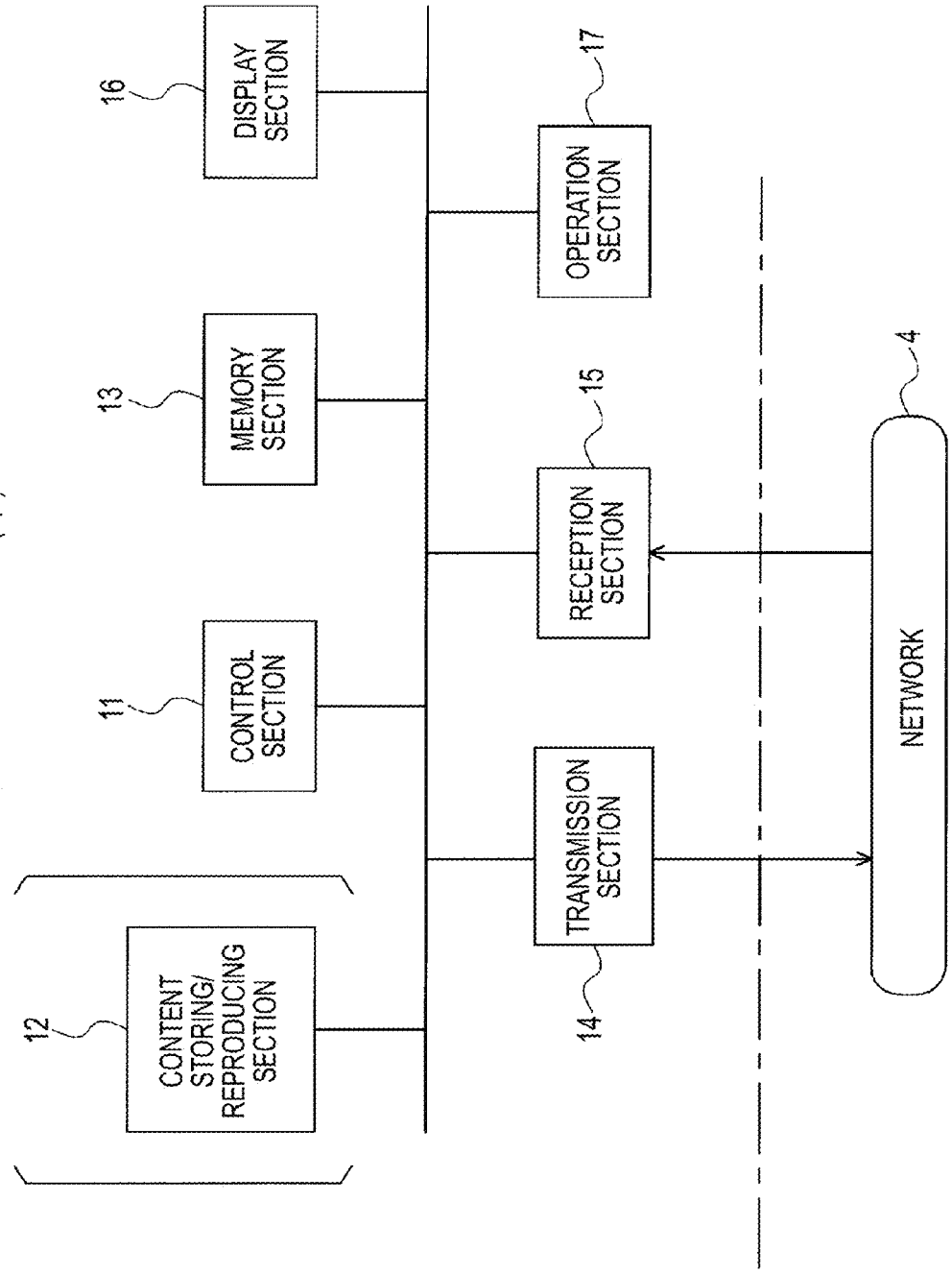

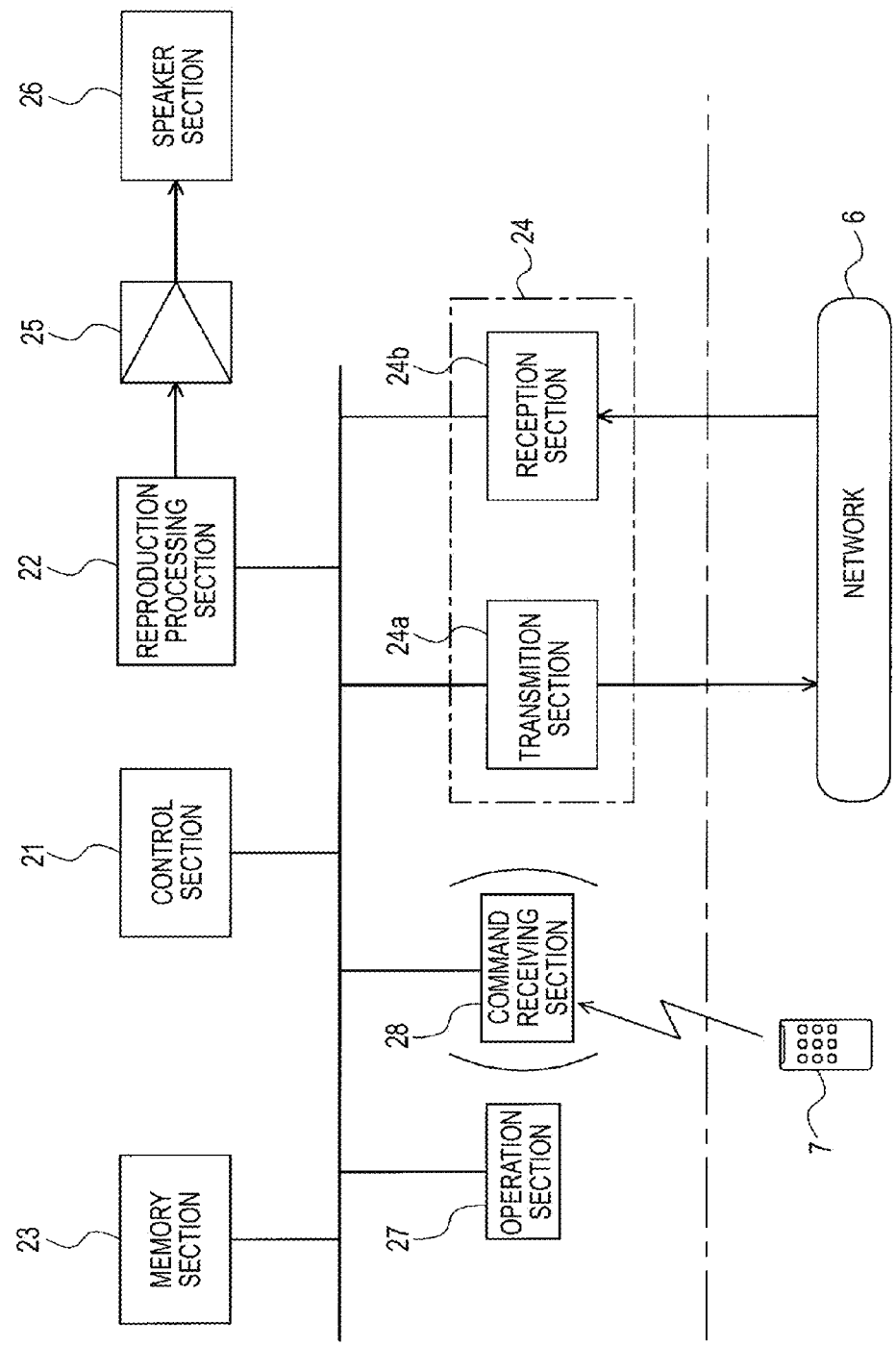

MANAGEMENT STRUCTURE THAT CLIENT
APPARATUS 5 IS SUPPOSED TO HANDLE

MANAGEMENT STRUCTURE HAVING MANAGEMENT ITEMS
THAT CLIENT APPARATUS 5 CAN NOT RECOGNIZE

NETWORK TERMINAL APPARATUS AND METHOD OF REQUESTING DISTRIBUTION

BACKGROUND OF THE INVENTION

1. Field of the Invention

The present invention relates to a network terminal apparatus forming part of a network for contents distribution and a method of requesting distribution of contents.

2. Description of the Related Art

Network systems for distributing content data such as music data and video data through a network are known.

Content distribution service (CDS) in compliance with the DLNA (Digital Living Network Alliance) standard is known as a system for managing music data files using a prescribed management structure employing file names and information added to the file names for purposes such as retrieval and identification of the data files. The service is also known as including the function of distributing and providing such a management structure through a network.

In such a system, a network terminal apparatus (client apparatus) can recognize a CDS management structure provided by a server apparatus, and a desired music data can be retrieved or found at the network terminal apparatus using the structure.

For example, home network systems formed by a content server apparatus and a client apparatus are constructed utilizing such a system.

In a home network system, a client apparatus which may be a video and audio output apparatus is provided in rooms of a house. For example, the client apparatus may be an apparatus having a television monitor or a speaker.

A content server apparatus provided in a predetermined room is communicably connected to a plurality of client apparatuses through a predetermined wired or wireless communication network.

Thus, video and audio contents distributed from the contents server can be listened to and viewed at each room of the house.

SUMMARY OF THE INVENTION

A user can operate a client apparatus to select arbitrary content and request the server apparatus to distribute the content. Thus, the selected content data can be distributed to the client apparatus and viewed or listened to using a monitor display or a speaker of the client apparatus.

For such a purpose, a client apparatus must be provided with a user interface to allow a user to select a content item. For example, the client apparatus must have an operation input section including, for example, many operation keys, a dial, and a touch panel. Further, the client apparatus must have a display section for displaying a list for selecting a content item and displaying operational guidance based on a CDS management structure.

On the other hand, there are strong demands for simplification of such a system, especially, a client apparatus. It is sometimes considered that a client apparatus is required only to function as an output device such as a speaker or a monitor display.

For example, let us assume that a home network is used for distributing music content from a server to a client apparatus in each room to play pieces of music in each room as BGM (background music). In this case, it is desirable to have a client apparatus which is compact and is therefore easy to install in various rooms. Further, since a great number of client apparatuses are installed in various rooms, the client apparatuses must be inexpensive.

However, a client apparatus must include a display section for selecting content as described above, an operation section to allow various operations of a user, and controls means to serve such purposes, e.g., processing programs associated with user operations which are assumed to take various forms. Such requirements can result in increases in material and development costs of a system. A system will consequently be expensive. Further, the need for providing a display section and various controls is disadvantageous in achieving a simple and compact system configuration.

A user of a client apparatus may wish to enjoy a piece of music extracted at random from pieces of music at a server. However, the user is required to specify a server and retrieve or identify a piece of music to listen to, in which case the operation is undesirably redundant and troublesome for the user.

Under the circumstance, it is desirable to provide a network terminal apparatus (client apparatus) which can be configured at a low cost and which allows content to be distributed and reproduced without redundant operations of a user.

According to an embodiment of the invention, there is provided a network terminal apparatus including a communication section communicating with a server apparatus communicable through a network, a reproduction section reproducing and outputting content data, a request processing section, and a reproduction controlling section. The request processing section performs a management structure requesting process for requesting the server apparatus communicable through the communication section to provide management structure information indicating a management structure for distributed content, a content selecting process for selecting an item of content data based on the management structure information acquired by the management structure requesting process, and a content requesting process for requesting a server apparatus identified as a distributor based on the management structure information to distribute the item of content data selected by the content selecting process without intervention of an operation performed by a user. The reproduction controlling section causes the reproduction section to reproduce the item of content data transmitted from the server apparatus according to the content requesting process.

The request processing section may execute a server selecting process for selecting a server apparatus communicable through the communication section without intervention of an operation performed by a user and may execute the management structure requesting process for the server apparatus selected by the server selecting process.

The request processing section may select a server apparatus which provides management structure information including recognizable management items as the server selecting process.

The request processing section may automatically select a management item included in management structure information acquired by the management structure requesting process, acquire contents list information indicating content data included in the automatically selected management item and distributors of the content data, and automatically select content data from the contents list information acquired.

The request processing section may perform a process of requesting the server apparatus transmitting the management structure information to provide a contents list to acquire the contents list information.

The network terminal apparatus may include an operation section for performing an operation of turning a power supply on or a reproducing operation, and the request processing section may execute the server selecting process, the list requesting process, the content selecting process, and the content requesting process without intervention of an operation performed by a user after the operation of turning the power supply on or the reproducing operation performed by the operation section.

The request processing section may perform the content requesting process by performing the content selecting process for selecting a new item of content data using contents list information used in the previous content selecting process to reproduce a new item of content data after the reproduction and output of an item of content data by the reproduction section is terminated.

The request processing section may perform the content requesting process by performing the content selecting process for selecting a new item of content data using management structure information used in the previous content selecting process to reproduce a new item of content data after the reproduction and output of an item of content data by the reproduction section is terminated.

The request processing section may perform the content requesting process by newly performing the management structure requesting process and the content selecting process to reproduce a new item of content data after the reproduction and output of an item of content data by the reproduction section is terminated.

The request processing section may perform the content requesting process by newly performing the server selecting process, the management structure requesting process, and the content selecting process to reproduce a new item of content data after the reproduction and output of an item of content data by the reproduction section is terminated.

The network terminal apparatus may further include a registration managing section registering at least distributor information included in an item of content data being reproduced and output by the reproduction section in a registration list according to an operation performed by a user. The request processing section can perform a content requesting process for requesting a server apparatus indicated by the distributor information to distribute an item of content data selected using the registration list.

According to another embodiment of the invention, there is provided a distribution requesting method of a network terminal apparatus including a communication section communicating with a server apparatus communicable through a network and a reproduction section reproducing and outputting content data, the method including the step of requesting a server apparatus communicable through the communication section to provide management structure information indicating a management structure for distributed content, selecting an item of content data based on the management structure information acquired, and requesting a server apparatus identified as a distributor based on the management structure information to distribute the selected item of content data without intervention of an operation performed by a user.

According to the embodiment of the invention, the network terminal apparatus requests a server to distribute a content item by performing a server selecting process, a management structure requesting process, a contents list requesting process, a content selecting process, and a distribution requesting process without intervention of operations of a user. Therefore, no user interface function is required for those processes. That is, the request processing section automatically executes those processes as control functions of the network terminal apparatus.

The network terminal apparatus according to the embodiment of the invention requires no user interface function to perform the server selecting process, the management structure requesting process, the contents list requesting process, the content selecting process, and the distribution requesting process in order to have a content item distributed. Thus, the network terminal apparatus requires only a user interface function that is very simple, and the network terminal apparatus can therefore be provided at a low cost with a simple and compact configuration.

Further, a user can enjoy a distributed content item only by performing very simple operations such as a power supply operation and a reproduction operation. Since there is no redundant operation, the apparatus has very high user friendliness.

BRIEF DESCRIPTION OF THE DRAWINGS

FIG. 1 is an illustration of a configuration of a network system according to an embodiment of the invention;

FIG. 2 is a block diagram of a server apparatus with which a client apparatus according to the embodiment of the invention communicates;

FIG. 4 is a block diagram of the client apparatus according to the embodiment of the invention;

DESCRIPTION OF THE PREFERRED EMBODIMENTS

Figure 3A:
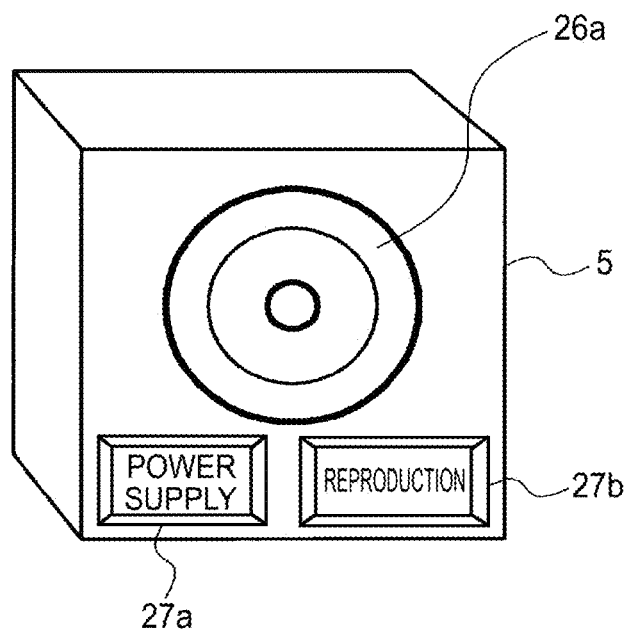
FIGS. 3A and 3B are illustrations showing external views of a client apparatus 5 according to the embodiment of the invention.

Embodiments of the invention will now be described. The following items will be described in the order listed.
<1. Configuration of Network System of Embodiment>
  [1-1 System Configuration]
  [1-2 Server Apparatus]
  [1-3 Client Apparatus]
<2. Functional Configuration of Client Apparatus>
<3. Distribution Requesting Process>
<4. Processes Associated with Registration of Preferred Items>
<5. Modifications>
<6. Program>
<1. Configuration of Network System of Embodiment>
[1-1 System Configuration]

A configuration of a network system according to the present embodiment will now be described with reference to FIG. 1.

FIG. 1 shows an example of a network system formed in a house. The system is shown as including apparatuses A to F, a router 4, and a client apparatus 5. The apparatuses A to F and the client apparatus 5 are disposed in various rooms of the house, and the apparatuses can communicate with each other through the router 4 to form a network 6.

While the network system of the present embodiment is provided as, for example, "home network system", the system of this embodiment is not limited to applications at home, and the system may be used in companies, schools, and public facilities. It is not essential to dispose the above-described apparatuses in rooms of the same building. For example, the apparatuses may be installed in outdoor locations and other buildings, e.g., a garden, a garage, and a storehouse and on the premises.

The network system of the present embodiment includes one or more content server apparatuses 1, one or more management server apparatuses 2, and one or more client apparatuses 3(5).

One apparatus may have a plurality of functions on the network. The functions include a content server function, a management server function, and a client function.

The content server function is the function of reproducing music content and video content from recording media and distributing the content to the client apparatus 3(5) on the network.

The management server function is a function having a content management structure, and the function provides management structure information for selecting content to the client apparatus 3(5) on the network.

The client function is the function of selecting content data based on the management structure information, requesting the content server 1 to distribute the data, receiving the distributed data, and reproducing or outputting the distributed content data to a user.

Some apparatuses on the network have one of those functions, and some apparatuses have a plurality of those functions. For example, an apparatus may serve as a content server apparatus 1 and a client apparatus 3. The apparatuses A to F shown in FIG. 1 are assumed to be apparatuses having various functions by way of example.

The apparatus A is an apparatus having the content server function, the management sever function, and the client function. Therefore, the apparatus A serves as a content server apparatus 1 and a management server apparatus 2 at the same time. Further, the apparatus A serves as a client apparatus 3.

The apparatus B is an apparatus having the content server function and the management server function. Therefore, the apparatus B serves as a content server apparatus 1 and a management server apparatus 2 at the same time.

The apparatus C is an apparatus having the content server function and the client function. Therefore, the apparatus B serves as a content server apparatus 1 and a client apparatus 3 at the same time.

The apparatus D is an apparatus having the management server function and the client function. Therefore, the apparatus D serves as a management server apparatus 2 and a client apparatus 3 at the same time.

The apparatus E is an apparatus having the content server function. Therefore, the apparatus E serves as a content server apparatus 1.

The apparatus F is an apparatus having the management server function. Therefore, the apparatus F serves as a management server apparatus 2.

The apparatuses A to F are shown as examples only to indicate that apparatuses having various functions can be provided on the network as thus described. It is not essential to provide all of the apparatuses A to F on a network in practice.

The network system of the present embodiment must include one or more content server apparatuses 1 serving as a source of content distributed and one or more management server apparatuses having a structure for managing content data. For example, the system may include the apparatus 1 only, and the system may alternatively include only the apparatuses E and F.

The term "content server apparatus 1" represents an apparatus such as the apparatus A, B, C, or E.

The term "management server apparatus 2" represents an apparatus such as the apparatus A, B, D, or F.

The term "client apparatus 3" represents an apparatus such as the apparatus A, C, or D.

In this network system, a network terminal apparatus according to the embodiment of the invention is represented by a "client apparatus 5" which is distinguished from the above-described "client apparatus 3".

The apparatus will now be described based on the assumption described above.

The content server apparatus 1 is capable of distributing content data such as audio data, video data, text data, and game data to each of the client apparatuses 3 and 5 through the network 6. For example, the content server apparatus 1 reproduces content data from a hard disc drive (HDD), a flash memory, or a replaceable optical disc player containing a plurality of optical discs such as a CD (Compact Disc), a DVD (Digital Versatile Disc), and a BD (Blu-ray Disc (registered trademark)). The reproduced content data are distributed to the client apparatuses 3 and 5.

The management server apparatus 2 has a structure for managing the content data in the content server apparatus 1 (e.g., a CDS management structure).

While an exemplary management structure will be described later, a management structure for music content may have a structure for performing categorized management of music content according to each of management items such as "all", "genres", "titles" and "artists". Information on content data included in each of the management items are managed by the structure. Information on each item of content data may include distributor information and information on the details of the content.

The distributor information includes information indicating the content server apparatus 1 serving as the source of the content data, information on the recording medium in which the data is stored, and information on the position in which the data is stored. That is, distributor information is information indicating a path to be used by the client apparatuses 3 and 5 to reach the content server apparatus 1 in requesting distribution of a certain item of content data.

For example, information on details of content includes the title of a piece of music, the name of the artist, and various types of attribute information.

The management structure provided in the management server apparatus 2 is a structure which allows the client apparatuses 3 and 5 to select an item of content data and to request a particular content server apparatus 1 to distribute the data according to distributor information when the structure is acquired by the apparatuses 3 and 5.

There are various alternatives as to which content server apparatus 1 the management structure provided in a management server apparatus 2 is to serve.

For example, in the case of the apparatus A, it may be considered that the apparatus A (a management server apparatus 2) has a structure for managing content data which can be distributed from the apparatus A (a content server apparatus 1).

In the case of the apparatuses E and F, the apparatus F (a management server apparatus 2) may have a structure for managing content data which can be distributed from the apparatus E (a content server apparatus 1).

A client apparatus 3 includes a monitor display and a speaker as integral or separate output devices. The apparatus receives content data distributed through the network 6 and outputs the data from the output devices as images and sounds.

Thus, the user of the client apparatus 3 can view and listen to the content data distributed as thus described.

Each client apparatus 3 is provided with operation buttons on the housing of the same, a touch panel section to be operated on the monitor, and a remote commander, and a user can input operations through those elements. A user can perform various operations to select a desired item of content data, to request a content server apparatus 1 to distribute the data, and to access the data distributed as thus described.

A client apparatus 5 according to the embodiment of the invention basically includes a monitor display and a speaker as integral or separate output devices like a client apparatus 3. Thus, the apparatus receives content data distributed through the network 6 and outputs the data from the output devices as images and sounds.

However, a client apparatus 5 is provided with a user interface which is merely the required minimum. For example, the apparatus has only a power supply key or a combination of a power supply key and a reproduction key to serve as an operation key. However, the apparatus may be accompanied by a remote controller associated therewith.

A client apparatus 5 has no display section displaying operational guidance.

For example, the network 6 connected through the router 4 is formed by wired or wireless transmission paths which allow domestic communication at home.

The network may have a wired configuration including lighting wires, RF cables for television, DLNA (Digital Living Network Alliance), and HDMI (High Definition Multimedia interface). The network may alternatively have a wireless communication system according to IEEE 1394.11a, b, n and Bluetooth and using the 2.4 GHz band.

[1-2 Server Apparatus]

An exemplary configuration of a content server apparatus 1 will now be described with reference to FIG. 2.

For example, the content server apparatus 1 includes a control section 11, a content storing/reproducing section 12, a memory section 13, a transmission section 14, a reception section 15, a display section 16, and an operation section 17.

The control section 11 is constituted by a microcomputer including a CPU (central processing unit), a ROM (read only memory), and a RAM (random access memory).

For example, information on various settings for a distribution operation is stored in the ROM of the control section 11 in addition to programs to be executed by the CPU. The RAM is a main storage to be used by the CPU.

The control section 11 controls the overall operation of a content server apparatus 1. For example, the control section controls a distribution operation by controlling a reproducing operation performed by the content storing/reproducing section 12, controlling transmission of content data CT from the transmission section 14, and performing a process of responding to a distribution request from client apparatuses 3 and 5 received at the reception section 15.

The memory section 13 collectively represents storages such as a RAM, a ROM, and a flash memory. The memory section 13 may be used as a work area for processes performed by the control section 11 or an area for storing programs. Further, the memory section may be used for storing the information of various settings for an distribution operation and storing parameters.

The memory section 13 may be also used as a transmission buffer for content data reproduced by the content storing/reproducing section 12 in preparation for distribution.

The content storing/reproducing section 12 is a device capable of reproducing various types of content data.

For example, content data are stored in a hard disc, a flash memory, or an optical disc. Based on an instruction from the control section 11, the content storing/reproducing section 12 reproduces the content data CT from such recording media. Therefore, the content storing/reproducing section 12 is provided in the form of, for example, an HDD, a flash memory player, an optical disc player, or a replaceable optical disc player.

The transmission section 14 and the reception section 15 function as sections for establishing communication with each client apparatus 2 through the network 6.

Under control performed by the control section 11, the transmission section 14 performs a predetermined encoding process primarily for communication of content data reproduced by the content storing/reproducing section 12 and transmits the data over the network or distributes the data to the client apparatuses 3 and 5.

The reception section 15 receives signals transmitted from the client apparatuses 3 and 5, e.g., a distribution request signal for requesting distribution of content data. The reception section decodes a signal thus received and transfers the content of the received information to the control section 11.

In order to enable processes as thus described, the transmission section 14 and the transmission section 15 perform the encoding process, the decoding process, and the transmission/reception process according to the wired or wireless communication method adopted for the network 6.

The operation section 17 represents various controls for allowing a user to provide input to the content server apparatus 1.

The display section 16 displays various matters associated with the content server apparatus 1.

The operation section 17 and the display section 16 serve as user interface means in the content server apparatus 1.

A content server apparatus 1 having neither operation section 17 nor display section 16 may be provided. For example, when operations at a server apparatus 1 is performed according to operation inputs from a client apparatus 3, there is no need for providing the content server apparatus 1 with the display section 16 and the operation section 17 serving as user interface means.

Although the configuration of a management server apparatus 2 is not shown, the configuration may be considered similar to that of the content server apparatus 1 shown in FIG. 2 except that a content storing/reproducing section 12 is not provided.

For example, a management server apparatus 2 includes a control section 11, a memory section 13, a transmission section 14, and a reception section 15. The apparatus may further include a display section 16 and an operation section 17.

The control section 11 of the management server apparatus 2 performs a process of managing and providing management structure information of a content server apparatus 1 associated therewith.

For example, the management structure information is stored in the memory section 13.

In response to requests from the client apparatuses 3 and 5, the control section 11 transmits information on management items of the management structure and performs a process of transmitting contents list information that is a management item.

The transmission section 14 performs a process of transmitting the management item information and contents list information.

The reception section 15 receives request for a management item of the management structure and requests for the contents list information from the client apparatuses 3 and 5 and transfers the request to the control section 11.

[1-3 Client Apparatus]

A configuration of a client apparatus 5 of the present embodiment will now be described with reference to FIGS. 3A, 3B, and 4.

Figure 3B:
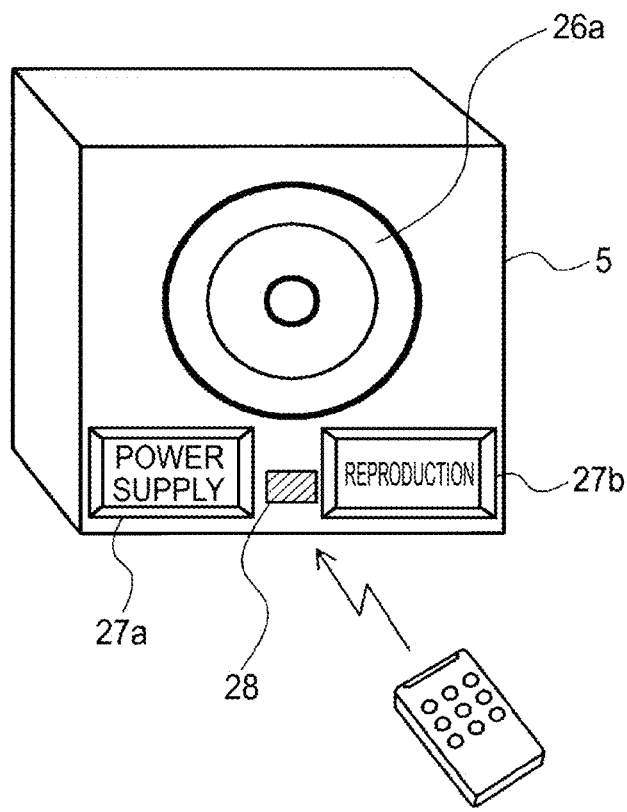

FIGS. 3A and 3B show an exemplary external view of the client apparatus 5.

For example, a client apparatus 5 according to the present embodiment may be a network terminal apparatus for distribution of music.

As shown in FIG. 3A, the client apparatus 5 has a speaker surface 26a provided on a housing thereof.

The apparatus includes a power supply key 27a and a reproduction key 27b to be operated by a user provided in predetermined positions thereof.

FIG. 3A is a schematic view of the apparatus, and the client apparatus 5 has a very simple configuration as illustrated. For example, there is no display section to be used as a user interface.

The apparatus may be accompanied by a remote controller 7 associated therewith as shown in FIG. 3B. In this case, the apparatus is provided with a command receiving section 28 for receiving command signals from the remote controller 7.

The apparatus has a speaker serving as a device for reproducing and outputting music contents. Obviously, a speaker system such as stereo speakers, three-channel speakers, and 5.1 channel speakers may be employed.

In this case, two or more speaker units may be disposed in one housing of the client apparatus 5, and the speaker units may alternatively be provided as separate bodies.

FIG. 4 shows an exemplary internal configuration of the client apparatus 5.

The client apparatus 5 includes a control section 21, a reproduction process section 22, a memory section 23, a network communication section 24, an amplifier section 25, a speaker section 26, an operation section 27, and a command receiving section 28.

The control section 21 is constituted by a microcomputer including a CPU, a ROM, and a RAM.

For example, information on various types of setting for an operation of reproducing distributed contents and an operation of communicating with a content server apparatus 1 is stored in the ROM of the control section 21 in addition to programs to be executed by the CPU. The RAM is a main storage to be used by the CPU.

The control section 21 controls the overall operation of the client apparatus 5. For example, the control section controls processes which will be described later, including a process of selecting a management server apparatus 2, a process of requesting the management server apparatus 2 to provide information on a management item of a management structure, a process of requesting contents list information, a process of selecting an item of content data to be distributed, and a process of requesting a content server apparatus 1 to distribute the item of content data.

The control section 21 performs a buffering process for reproducing and outputting such an item of content data received and a process of controlling the reproduction process section 22.

The memory section 23 collectively represents storages such as a RAM, a ROM, and a flash memory. The memory section 23 may be used as a work area for processes performed by the control section 21, and the section may alternatively be used as an area for storing programs. The memory section is also used for storing information on various settings for a reproduction operation and a communication operation and for storing parameters.

The memory section 23 is also used as a buffer memory for received content data.

The network communication section 24 includes a transmission section 24a and a reception section 24b, and the section communicates with a content server apparatus 1 and a management server apparatus 2 through the network 6.

The transmission section 24a performs a process of transmitting a request signal for requesting a management server apparatus 2 to management item information and contents list information under control performed by the control section 21.

The reception section 24b receives signals transmitted from a content server apparatus 1 such as content data distributed from the same and decodes the signals received. When a distributed item of content data is received, the reception section performs the decoding process according to the communication method used for reception and transfers the resultant content data (stream data) to, for example the memory section 23 to buffer the data therein under control performed by the control section 21.

The reception section 24b receives signals transmitted from a management server apparatus 2 such as information on a management item of the management structure that the management server apparatus 2 has and contents list information. The reception section decodes the signals received and transfers the content of the information to the control section 21.

In order to perform processes as thus described, the transmission section 24a and the reception section 24b perform encoding, decoding, and transmission/reception processes in accordance with the wired or wireless communication method used on the network 6.

The reproduction process section 22 performs processes for reproducing and outputting received content data. For example, received content data are buffered in the memory section 23, and items of data forming part of the buffered content data are sequentially transferred to the reproduction process section 22 at predetermined timing. The reproduction process section 22 performs processes for outputting the content data such as a process of decoding a compression process applied to the data, error correction, and a D-A conversion process and supplies resultant audio signals to the amplifier section 25.

The amplifier section 25 performs an amplification process, an equalizing process and the like on the signals and supplies resultant audio signals to the speaker section 26.

The speaker section 26 provides audio output based in the audio signals supplied thereto.

The operation section 27 includes a power supply key 27a and the reproduction key 27b as shown in FIGS. 3A and 3B.

When a user presses the power supply key 27a and the reproduction key 27b, the operations are recognized by the control section 21.

In this embodiment, the client apparatus 5 does not have any other operating element. That is, a user can perform only operations which are the required minimum, i.e., turning power on/off and starting reproduction.

The reproduction key 27b may be deleted to leave only the power supply key 27a.

The command receiving section 28 is provided when a remote controller 7 associated with the apparatus is used as shown in FIG. 3B. In particular, the remote controller 7 and the command receiving section 28 may be provided when processes associated with registration of preferred items are employed as described later.

The command receiving section 28 receives command information from the remote controller 7. The remote controller 7 is a device for transmitting command information according to a user's operation using electric waves, infrared light or wired communication. Command information transmitted from the remote controller 7 is received and demodulated by the command receiving section 28 and transferred to the control section 21.

An exemplary configuration of a client apparatus 5 has been described above, and a client apparatus 3 has a configuration substantially similar to the described configuration. However, the client apparatus 3 may have operation keys and a display section of different types as user interface means.

The apparatus A shown in FIG. 1 may have the features of a content server apparatus 1, a management server apparatus 2, and client apparatuses 3 and 5 as described above.

The apparatus B may have the features of a content server apparatus 1 and a management server apparatus 2. The description similarly applies to the other apparatuses C to F.

<2. Functional Configuration of Client Apparatus>

A functional configuration of a client apparatus 5 according to the preset embodiment and, in particular, a functional configuration of the control section 21 will now be described.

Figure 5:
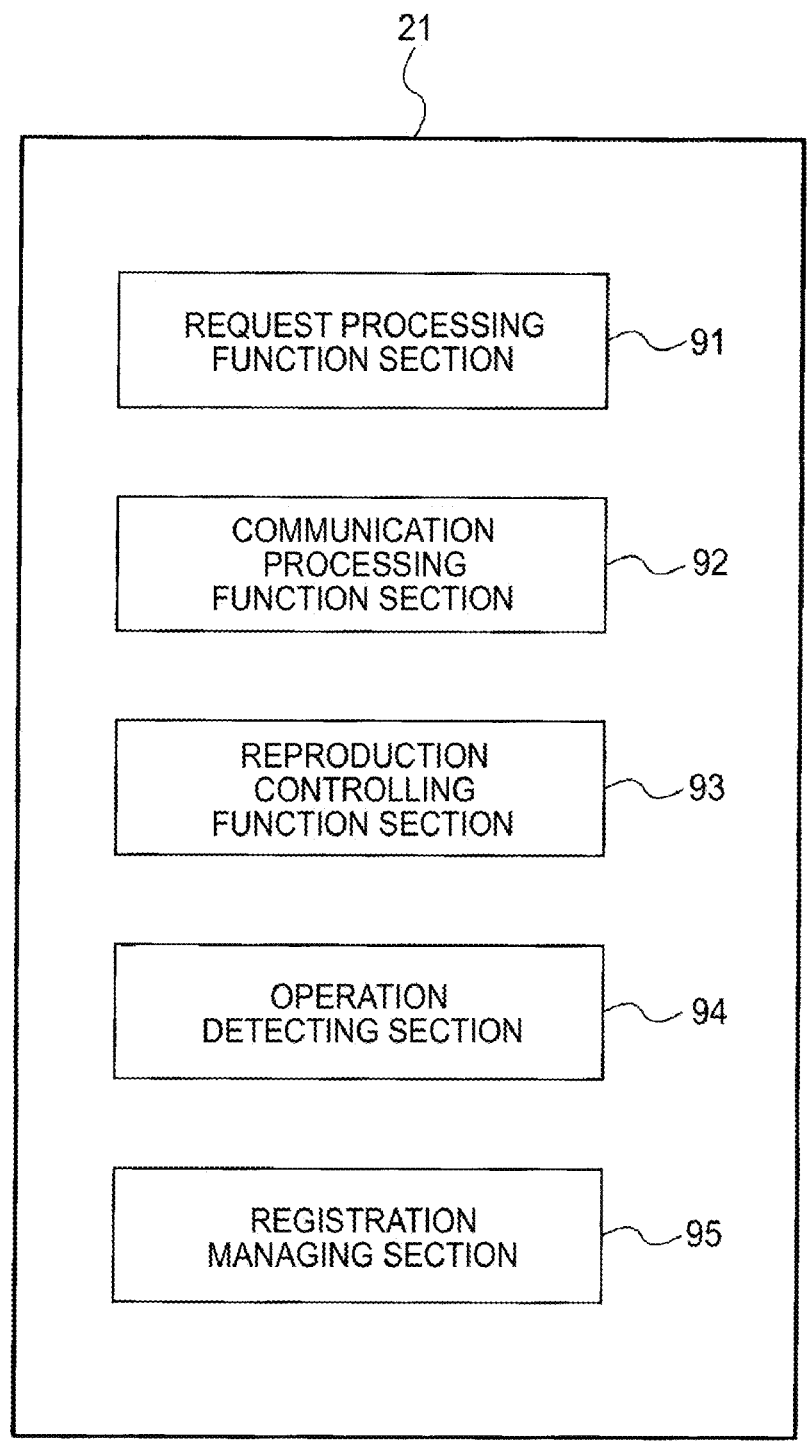
FIG. 5 is an illustration of a functional configuration of the client apparatus according to the embodiment of the invention.

FIG. 5 shows an exemplary functional configuration of the control section 21 of a client apparatus 5 implemented using hardware or software (programs).

The control section 21 has a request processing function section 91, a communication processing function section 92, a reproduction controlling function section 93, an operation detecting section 94, and a registration managing section 95 as functional features thereof.

Although FIG. 5 shows those functional parts in the form of blocks, it is not essential to provide each of the functional blocks as an independent program module or hardware. What is required in practice is that those sections having a control function can collectively perform processes and operations of the embodiment as described later.

The request processing function section 91 performs various requesting processes and selecting processes for receiving distribution of contents.

Specifically, the request processing function section 91 performs a server selecting process for selecting a server apparatus (a content server apparatus 1 or a management server apparatus 2) which can be communicated through the network communication section 24.

Further, the request processing function section 91 performs management structure requesting processes for requesting a management server apparatus 2 selected as thus described to provide management structure information indicating the management structure of a content item distributed. For example, the request processing function section 91 performs a process of requesting the management server apparatus 2 to provide information on management items included in the management structure information and a process of requesting content data included in the management items and contents list information indicating the distributors of the content data.

The request processing function section 91 performs a content selecting process for selecting content data based on the management structure information acquired by the above-described management structure requesting process.

For this purpose, the request processing function section 91 performs, for example, a process of automatically selecting a management item thus acquired and a process of automatically selecting an item of content data from the acquired contents list information.

The request processing function section 91 performs a content requesting process to send a request for the distribution of the item of content data selected by the above-described content selecting process to the content server apparatus 1 which has been identified as the distributor of the data based on the management structure information.

The request processing function section 91 performs those processes without the intervention of operations of a user.

The communication processing function section 92 controls communication operations performed between the apparatus and a content server apparatus 1 and a management server apparatus 2 through the network communication section 24. For example, the communication processing function section 92 instructs the transmission section 24a to perform communication for authentication of a server, transmission of a management structure requesting signal, and transmission of a content requesting signal.

Further, the communication processing function section 92 performs a process of recognizing information received at the reception section 24b, e.g., management item information and contents list information and controls the process of buffering content data.

The reproduction control function section 93 has the function of controlling reproduction and output of an item of content data distributed. For example, the reproduction control function section 93 controls a process of transferring a buffered item of content data to the reproduction process section 22 and instructs the reproduction process section 22 to decode the data.

The operation detecting section 94 has the function of recognizing an operation performed by a user using the operation section 27. When the command receiving section 28 is provided, the operation detecting section 94 also performs a process of detecting a command signal CMD received.

The registration managing section 95 has the function of performing processes associated with registration of preferred items which will be described later.

A client apparatus 5 according to the embodiment can perform a distribution requesting process as described later because the control section 21 of the apparatus has functions as thus described.

Referring to correspondence between the above-described features and the features described in the claims of the invention, the control section 21 (the request processing function section 91) corresponds to the requesting process section described in the claims, and the control section 21 also corresponds to the reproduction control section described in the claims.

<3. Distribution Requesting Process>

Processes performed at a client apparatus 5 according to the embodiment of the invention will now be described.

Figure 6:
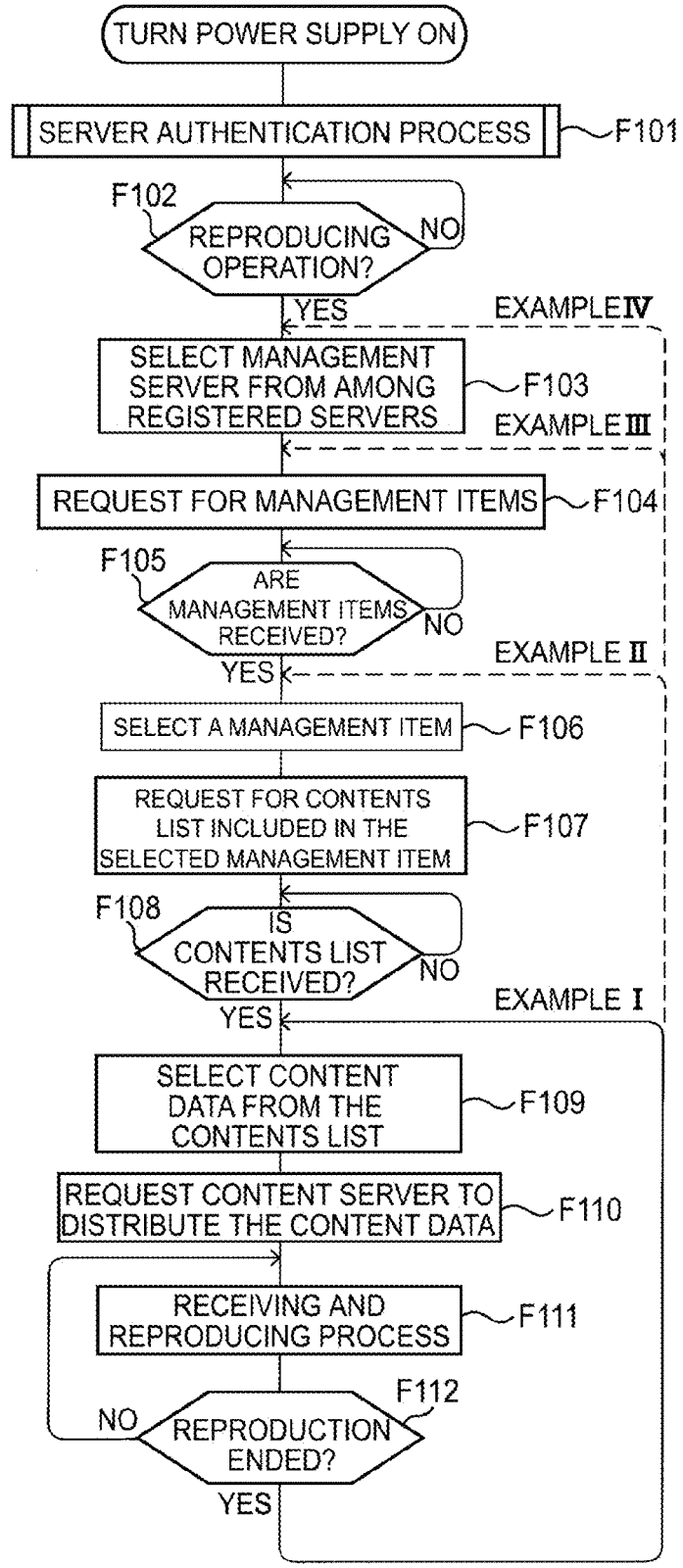
FIG. 6 is a flow chart of processes performed by the client apparatus according to the embodiment of the invention.

FIG. 6 is a flow chart of processes performed by the control section 21 having the above-described functional features.

When an operation on the power supply key 27a is detected as a user's operation on the client apparatus 5, the control section 21 performs a power-on process to start the processes shown in FIG. 6.

The client apparatus 5 is required only to have the configuration shown in FIG. 3A to execute the processes explained below with reference to FIG. 6, and the apparatus does not need to have a remote controller 7 and a command receiving section 28 associated therewith as shown in FIG. 3A and FIG. 4.

After the power supply is turned on, the control section 21 first performs a server authentication process at step F101.

Figure 7A:
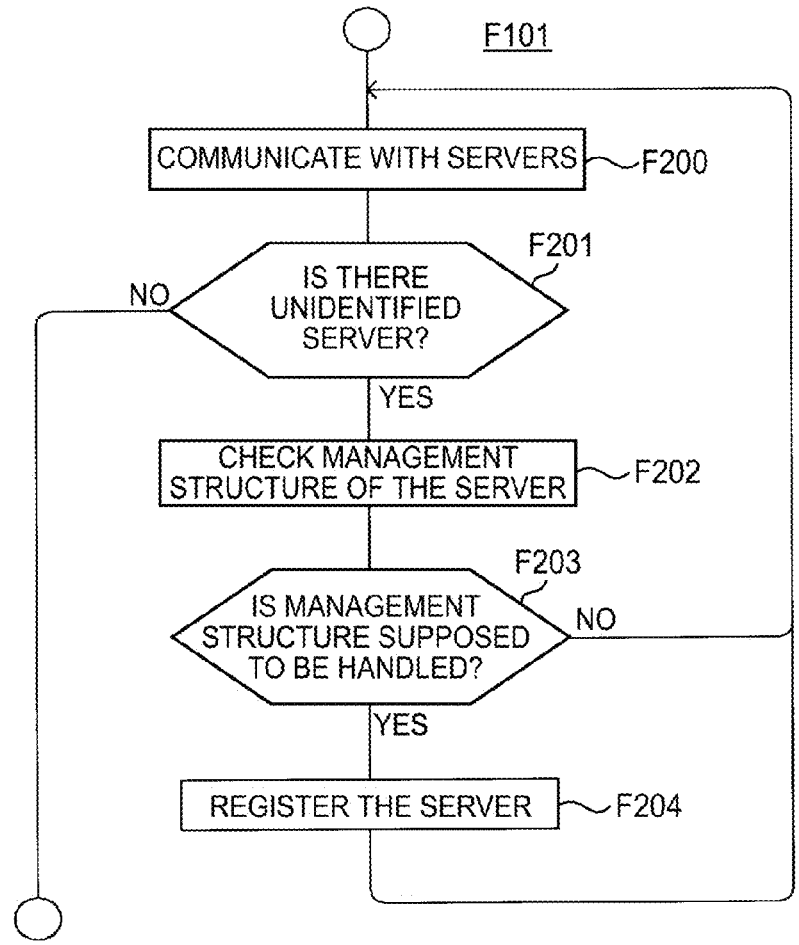
FIGS. 7A and 7B are flow charts of a server authentication process according to the embodiment of the invention.

An example of server authentication process is shown in FIG. 7A.

As the server authentication process, the control section 21 first searches for management server apparatus 2 with which the apparatus can communicate through the network 6 at step F200 and authenticate each of the management server apparatus 2.

When there is any management server apparatus 2 which has not been identified yet, the process proceeds from step F201 to step F202 to check the management structure that the unidentified management server apparatus 2 has. For example, the management server apparatus 2 is inquired about the type of the management structure.

When the management structure of the management server apparatus 2 is a management structure that the client apparatus 5 is supposed to accommodate or a management structure managing items that the client apparatus 5 can recognize, the management server apparatus 2 is registered as a server to be accommodated at step F204. That is, the apparatus is registered as a server to be connected for selecting an item of content data to be distributed.

When the management structure possessed by the management server apparatus 2 is not a management structure that the client apparatus 5 is not supposed to accommodate, the management server apparatus 2 is not registered as a server to be accommodated.

Figure 8A:
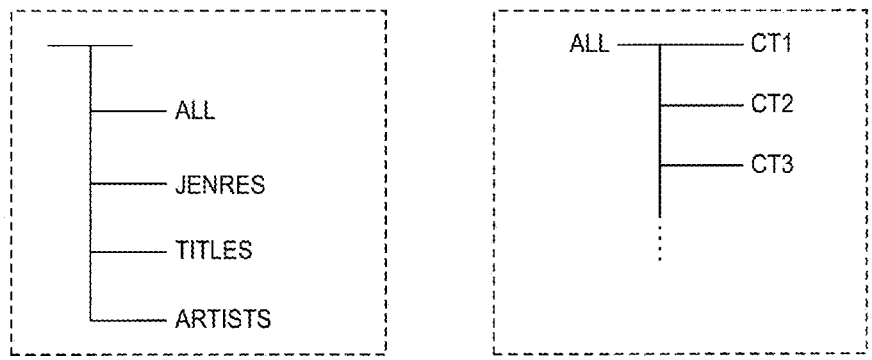
FIGS. 8A and 8B are illustrations showing management structures used in the embodiment of the invention.

FIG. 8A shows an example of management structure that the client apparatus 5 is supposed to accommodate.

For example, let us assume that the client apparatus 5 is supposed to accommodate a structure in which content data as music contents are managed by classifying them into each of management items "ALL", "genres", "titles", and "artists" as shown in FIG. 8A.

When a certain management server apparatus 2 manages content data using the management items "ALL", "genres", "titles", and "artists", the management server apparatus 2 will be registered as a server to be accommodated.

The management server apparatus 2 manages information on content data included in each of the management items. For example, pieces of content information CT1, CT2, CT3, and so on associated with all items of content data which can be distributed from content server apparatus 1 managed by the management server apparatus 2 are stored as the management item "ALL", as illustrated. That is, the pieces of information constitute contents list information.

Each of the pieces of content information CT1, CT2, CT3, and so on includes information on the distributor if a certain item of content data and information on details of the content.

The above-description equally applies to the other management items "genres", "titles", and "artists". For example, the management item "genres" is in a hierarchical structure in which the item is accompanied by subordinate items such as "rock", "jazz", and "classic". For example, pieces of content information CT1, CT5, and so on are provided as content information categorized as "rock".

The client apparatus 5 can request distribution of a selected item of content data as will be described later by obtaining information on the items managed by the management structure and contents list information derived from the management items.

Figure 8B:
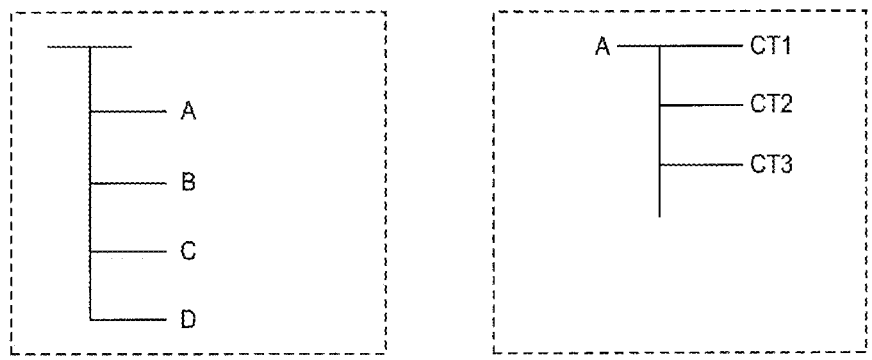

FIG. 8B shows examples of management items that the client apparatus 5 is not supposed to accommodate. Management items "A", "B", "C", and "D" are shown in such a mode of designation to indicate that the client apparatus 5 cannot recognize the meaning of those items.

In the present embodiment of the invention, when a management structure possessed by a certain management server apparatus 2 includes management items which cannot be recognized by the client apparatus 5 as thus described, the management server apparatus 2 is not regarded as a server to be accommodated.

For example, when a server authentication process is performed as the process shown in FIG. 7A, the control section 21 proceeds to the process at step F102 shown in FIG. 6 to wait for a reproduction operation.

The user may operate the reproduction key 27b to request reproduction of data through distribution.

When the operation to the reproduction key 27b is detected, the control section 21 proceeds from step F102 to step F103.

At step F103, the control section 21 automatically selects one management server apparatus 2 from among management server apparatus 2 registered as servers that the client apparatus accommodates. That is, selection is carried out by the control section 21 without any operation by the user.

The selection may be a process of selecting one of the management server apparatus 2 according to the order in which the servers have been registered. Alternatively, the selection may be made by a process of selecting one of the registered management server apparatus 2 at random based on a random number. Further, the selection may be carried out by a process of referring to a history of server selection made in the past.

When the control section 21 selects a certain management server apparatus 2, the process proceeds to step F104 to request the management server apparatus 2 to provide information on items managed by the management structure thereof. Specifically, the control section causes the transmission section 24a to transmit a signal requesting the selected management server apparatus 2 to provide the management item information.

The management server apparatus 2 transmits the management item information in response.

When the control section 21 recognizes that the management item information from the management server apparatus 2 has been received at the reception section 24b, the process proceeds from step F105 to step F106. Then, the control section 21 automatically selects one management item from the management item information received.

For example, the control section 21 performs a process of selecting the item "ALL" from among management items "ALL", "genres", "titles", and "artists".

In this case again, the selection of a management item may be carried out according to the order of registration of the management items, on an at random basis, or with reference to a history of selection in the past.

As described above, a management server apparatus 2 regarded as a server to be accommodated is a management server apparatus 2 supposed to have management items that the control section 21 can accommodate.

When information on items managed by the management structure of each management server apparatus 2 has been stored at the time of registration, the control section 21 can execute the management item selecting process at step F106 without performing the communication processes at steps F104 and F105. The reason is that the control section can recognize items managed by a management server apparatus 2 when the management server apparatus 2 is selected. Therefore, the processes at steps F104 and F105 may be skipped.

It is preferable to exchange management item information at the processes of steps F104 and F105 in some occasions, e.g., when information on items managed by each management server apparatus 2 has not been stored and when there are many management structures which can be recognized.

When a management item is selected at step F106, the control section 21 requests the selected management server apparatus 2 to provide the contents list information associated with the selected management item at step F107. Specifically, the control section 21 causes the transmission section 24a to transmit a signal requesting the selected management server apparatus 2 to provide information on a list of contents included in the management item selected.

The management server apparatus 2 transmits contents list information in response. For example, information listing pieces of contents information CT1, CT2, and so on included in the item "ALL" as shown on the right side of FIG. 8A is transmitted.

When the control section 21 recognizes that contents list information from the management server apparatus 2 has been received at the reception section 24b, the process proceeds from step F108 to step F109.

The control section 21 automatically selects one item of content data from the contents list information received.

The selection may involve a process of selecting one of the items of content data according to the order in which the items are listed in the contents list information. Alternatively, the selection may involve a process of selecting one item of content data included in the contents list information at random based on a random number. Further, the selection may alternatively involve a process carried out with reference to a history of content data selection made in the past.

When one item of content data is selected, the control section 21 requests the content server to distribute the item at step F110.

Specifically, the control section refers to distributor information included in the content information CT1 associated with the selected item of content data. As described above, the distributor information includes information indicating the content server apparatus 1 distributing the item of content data or information indicating a path for requesting the distribution of the content item.

The control section 21 requests the content server apparatus 1 specified by the distributor information to distribute the selected item of content data. Specifically, the control section causes the transmission section 24a to transmit a signal including information specifying the item of content data and requesting the distribution of the item of content data to the content server apparatus 1 indicated by the distributor information.

In response, the content server apparatus 1 reproduces the specified item of content data and transmits the same.

The control section 21 proceeds to step F111 to control a process of receiving and reproducing the item of content data. Specifically, the control section causes the reception section 24b to receive the item of content data, to buffer the data, to transfer the data to the reproduction process section 22, and to execute a decoding process, and the control section causes the speaker section 26 to reproduce and output the music content.

Through the above-described steps, a piece of music content is reproduced and output as a result of distribution from a content server apparatus 1.

When reproduction of one piece of music content is terminated, distribution of another piece of music content is subsequently requested. As a result, pieces of music are reproduced and output from the client apparatus 5 one after another to allow the user to enjoy the pieces of music as BGM without intervention of the user's operation.

At step F112, the control section 21 monitors the termination of the reproduction of the distributed piece of content. After it is determined at step F112 that the reproduction has terminated, any of exemplary processes I to IV shown in FIG. 6 may be performed as the next distribution requesting process.

In Example I, when the reproduction of one piece of music ends, the control section 21 returns to step F109 to request distribution of another piece of music.

At step F109, the control section 21 refers to the contents list information previously received at step F108 to select another piece of content data. At step F110, the control section performs a process of requesting the relevant content server apparatus 1 to distribute the selected piece of content data based on the distributor information.

Thus, the piece of content data is distributed, and the next piece of music is reproduced and output by the process at step F111.

In Example I, in order to reproduce a new piece of content data after the reproduction of a piece of content data is terminated, the control section 21 selects the new piece of content data using the contents list information which has been used in the previous content selecting process and performs a process of requesting the selected item of content data.

The processes in Example 1 make it possible to reproduce and output a multiplicity of items of content data managed as a common item to be managed consecutively by requesting distribution of the content data commonly managed using contents list information which has been already received. The process to follow the end of reproduction of one piece of distributed content is simple enough to allow the distribution and reproduction of the next piece of content to be started immediately.

In Example II, when the reproduction of one piece of music ends, the control section 21 returns to step F106 to make a request for distribution.

At step F106, the control section 21 refers to the information in management items previously received at step S105 (or information on management items which has been obtained in association with the previously selected management server apparatus 2) to select a new management item. At step F107, the control section 21 requests the management server apparatus 2 to provide the contents list information associated with the management item thus selected. When the contents list information is received at step F108, an item of content data is selected from the contents list information at step F109. Thereafter, the control section performs a process of requesting the content server apparatus 1 to distribute the selected item of content data at step F110.

Thus, the distribution of the piece of content data is accepted by the process at step F111 to reproduce and output the next piece of music.

In Example II, in order to reproduce a new piece of content data after the reproduction and output of a piece of content is terminated, the control section 21 selects the new piece of content data based on the management structure information (the management item information, in this case) used in the previous content selecting process.

The processes of Example II make it possible to request consecutive distribution of a multiplicity of pieces of content data by selecting a new management item using management structure information (management item information) which has already been received. The example is therefore suitable for distribution of a wide variety of pieces of music.

Example III is an example in which the control section 21 returns to step F104 when the reproduction of one piece of music ends.

At step F104, the control section 21 requests the previously selected management server apparatus 2 to provide information on items managed by the same. Then, the processes at steps F105 to F109 are performed, and the control section performs at step F110 a process of requesting the content server apparatus 1 to distribute a selected piece of content data.

Thus, the distribution of the piece of content data is accepted by the process at step F111 to reproduce and output the next piece of music.

In Example III, in order to reproduce a new piece of content data after the end of reproduction and output of a piece of content data, the control section 21 performs a management structure requesting process again. Thereafter, the control section 21 requests a new item of content data by selecting a management item, receiving content lists information, and performing a process of selecting a piece of content.

When one management server apparatus 2 has a plurality of management structures of different type, the process of Example III makes it possible to make distribution requests using the plurality of management structures.

Example IV is an example in which the control section 21 returns to step F103 when the reproduction of one piece of music ends.

At step F103, the control section 21 selects a management server apparatus 2. Then, the processes at steps F104 to F109 are performed, and the control section performs a process of requesting a content server apparatus 1 to distribute a selected item of content data at step F110.

Thus, the distribution of the piece of content data is received by the process at step F111 to reproduce and output the next piece of music.

In Example IV, in order to reproduce a new piece of content data after the end of reproduction and output of a piece of content data, the control section 21 performs a management server selecting process again. Thereafter, the control section 21 requests a new item of content data by requesting information on the management structure, selecting a management item, receiving content lists information, and performing a process of selecting a piece of content.

The processes of Example IV allows requests for distribution to be made sequentially using a plurality of management server apparatus 2, and the example is therefore suitable for distribution and reproduction of a wide variety of pieces of music.

In any of Examples I to IV, the processes up to step F109 for selecting a piece of content data may be executed before the reproduction of content in progress is terminated. As a result, the amount of processes to be executed between the end of reproduction of a piece of content and the beginning of reproduction of the next piece of content can be kept small, and the next distribution and reproduction can be started quickly.

Selection made at the processes in Examples I to IV may be carried out according to settings made by a user in advance or may be carried out at random.

Examples of processes performed by a client apparatus 5 according to the embodiment of the invention have been described above with reference to FIG. 6, and the following advantages can be achieved by the processes.

At the client apparatus 5, after the reproduction operation is performed at step F102 as shown in FIG. 6, the processes at steps F103 to F110 are executed without any intervention of user operations to proceed to the reproduction and output of a distributed item of content data at step F111.

Therefore, a user is required only to press the reproduction key 27*b* after pressing the power supply key 27*a* to enjoy a distributed piece of music. For example, it is assumed that a network system is frequently used for enjoying reproduction of distributed pieces of music as BGM. In such a situation, if reproduction can be carried out without requiring a user to perform troublesome operations, a very comfortable distribution environment can be provided.

The processes performed to distribute a new piece of music described above as Examples I to IV eliminate the need for a user to perform operations for consecutive distribution and reproduction of pieces of music. In addition, Examples I to IV may be appropriately adopted to allow a user to select distributed pieces of music according to the preference of the user or to distribute pieces of music in a highly random manner.

What is required to be provided as user interface means is only the power supply key 27*a* and the reproduction key 27*b*. There is no need for providing a display section displaying a list of distributed contents selecting an item and an operation section enabling selecting operations.

As a result, a client apparatus 5 can be provided with a simple configuration as shown in FIG. 3A, and the apparatus can therefore be provided at a low cost in a simple configuration and a small size.

<4. Processes Associated with Registration of Preferred Items>

When a client apparatus 5 reproduces and outputs pieces of music distributed through the processes shown in FIG. 6, the pieces of music are selected regardless of the intention of the user. As described above, the processes are very much advantageous in that no operational burden is placed on the user in reproducing and outputting the pieces of music when the music is considered to be used as BGM. On the other hand, a user sometimes wishes to listen to pieces of music according to his or her preference.

A description will now be made on a technique for reproducing pieces of music from a client apparatus 5 in a manner satisfying a user's preference as much as possible while minimizing operations involved.

The technique is based on an assumption that the client apparatus 5 is accompanied by a remote controller 7 associated therewith and includes a command receiving section 28 as described with reference to FIGS. 3B and 4. A user can input his or her operations using the remote controller 7.

The remote controller 7 is provided with at least a registration key and an operation key for reproducing a preferred item. If the registration key and the operation key for reproducing a preferred item are provided as an operation section 27 disposed on the housing of the client apparatus 5, there is no need for providing the remote controller 7 and the command receiving section 28.

The control section 21 of the client apparatus 5 the function of a registration management section 95 as described above with reference to FIG. 5. The registration managing section 95 performs a process of registering an item in a list of preferred items according to operations of the user.

Figures 9A, 9B:
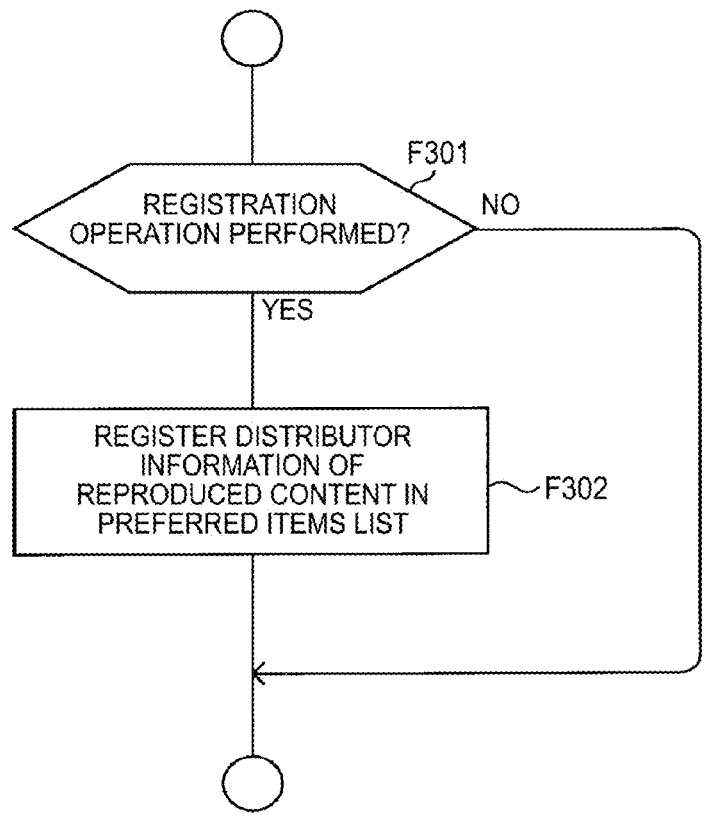
FIG. 9A shows a table for explaining registration of content items in a preferred items list according to the embodiment of the invention.
FIG. 9B is a flow chart for explaining registration of a content item in the preferred items list.

For example, the preferred items list is a list in which information on distributors of content data and contents information is stored in association with registration numbers, as shown in FIG. 9A. Although the list includes contents information, what is required at least is to register distributing content server apparatus 1 as distributor information and information specifying items of content data in the list.

User may operate the registration key of the remote controller 7 at arbitrary timing while a piece of music distributed through the processes shown in FIG. 6 is being reproduced.

The control section 21 uses the function of the registration managing section 95 to perform the process shown in FIG. 9B in response to the operation on the registration key.

Specifically, when the user's operation on the registration key is recognized through the command receiving section 28, the process proceeds from step F301 to step F302, and the distributor information of the item of content data being reproduced at this point in time is registered in the preferred items list. For example, the preferred items list is stored in the flash memory of the memory section 13.

The process allows the user to register information on pieces of music, i.e., numbers 1, 2, and so on sequentially as shown in FIG. 9A by operating the registration key each time a preferred piece of music is reproduced. Thus, list information is generated as a preferred items list.

Figure 10:
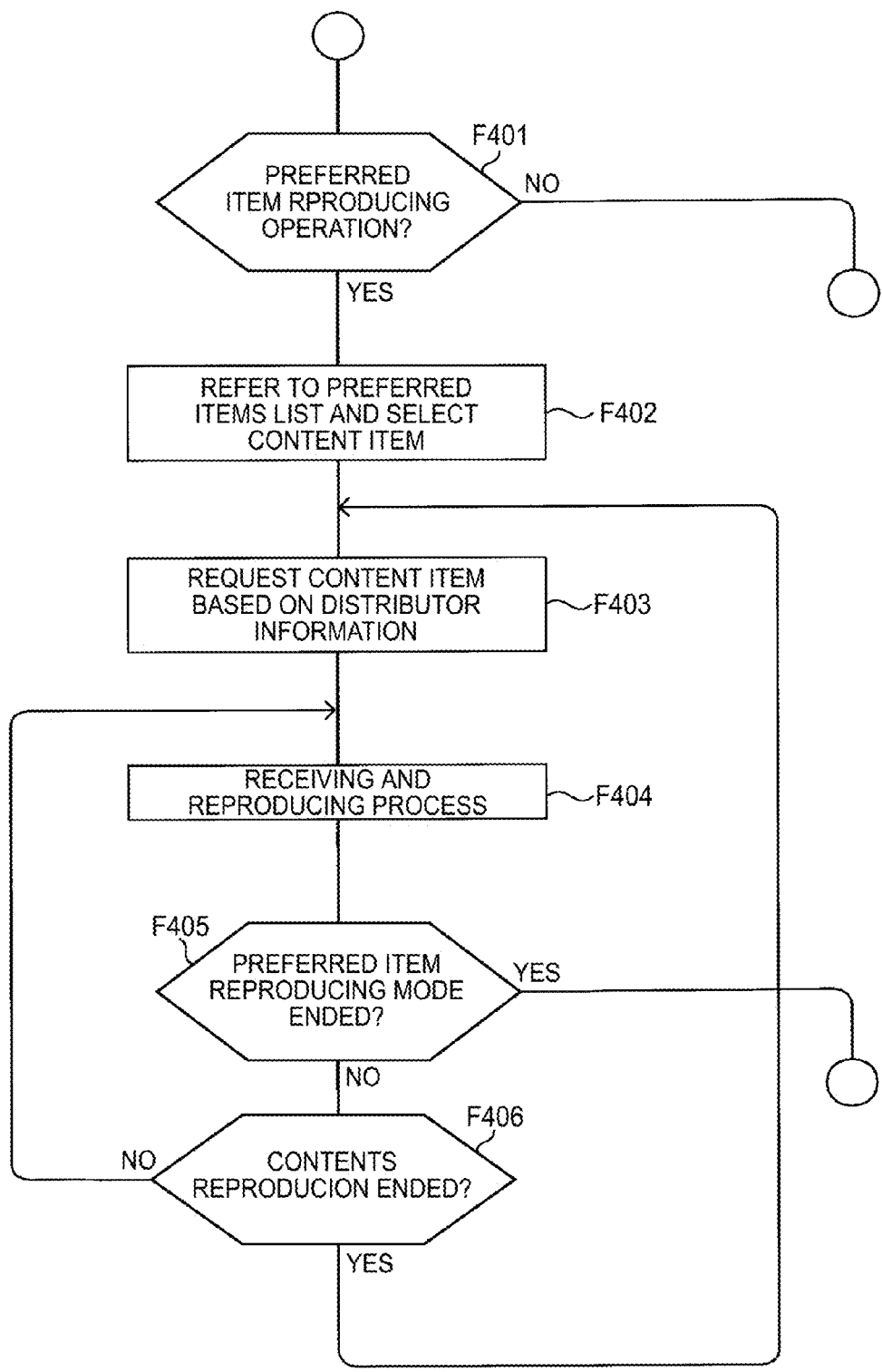
FIG. 10 is a flow chart of a distribution request based on registration in a preferred items list according to the embodiment of the invention.

The user may operation a preferred item reproduction key provided on the remote controller 7. The control section 21 (request processing function section 91) performs the process shown in FIG. 10 when it recognizes an operation on the preferred item reproduction key through the command receiving section 28, for example, during reproduction of an item through the processes shown in FIG. 6.

First, when the operation is recognized the process proceeds from step F401 to F402 at which the latest preferred items list is referred to and an item of content data (a registered number) is automatically selected.

In this case, an item of content data may be selected according to the order of the numbers registered in the preferred items list. Alternatively, an item of content data may be selected at random from among the numbers registered in the preferred items list.

When one item of content data is selected, the control section 21 requests a predetermined content server apparatus 1 to distribute the item of content data using distributor information associated with the registered number thus selected, at step F403.

At step F404, the control section exercises control over the reception, buffering, reproduction, and output of the item of content data distributed from the content server apparatus 1.

When the reproduction and output of the content data is finished, the control section 21 returns from step F406 to F402 to select another item of content data (registered number) from among the preferred items list, and the processes at step F403 and later steps are performed.

The above-described process is repeated until the preferred item reproduction mode is terminated at step F405. It may be determined that the preferred item reproduction mode has ended, for example, when the reproduction and output of all items of content data registered in the preferred items list has been finished. Such a determination may alternatively be made when the user presses the reproduction key 27b or the power supply key 27a. When the remote controller 7 has a key to terminate the reproduction of preferred items, it may be determined that the reproduction mode has ended when an operation of the key is detected.

When items of content data are requested, distributed, reproduced, and output based on a preferred items list as thus described, a user can enjoy preferred items of music content consecutively by performing only a minimum required operation (an operation on the preferred item reproduction key).

<5. Modification>

While processes performed by a client apparatus 5 according the embodiment of the invention have been described above, the invention may be modified in various ways.

First, although the client apparatus 5 of the above embodiment has been described as receiving distribution of music contents, the invention may alternatively be embodied in a client apparatus 5 which receives distribution of video contents.

In such a case, the client apparatus 5 is provided with a video reproduction processing section and a monitor display in addition to the features shown in FIG. 4. Thus, pictures and sounds can be reproduced and output as content data to be viewed and listened to by a user.

While a monitor display device and a speaker device may be provided integrally with the client apparatus 5 within the housing of the apparatus, the devices may obviously provided separately from the apparatus.

Figure 7B:
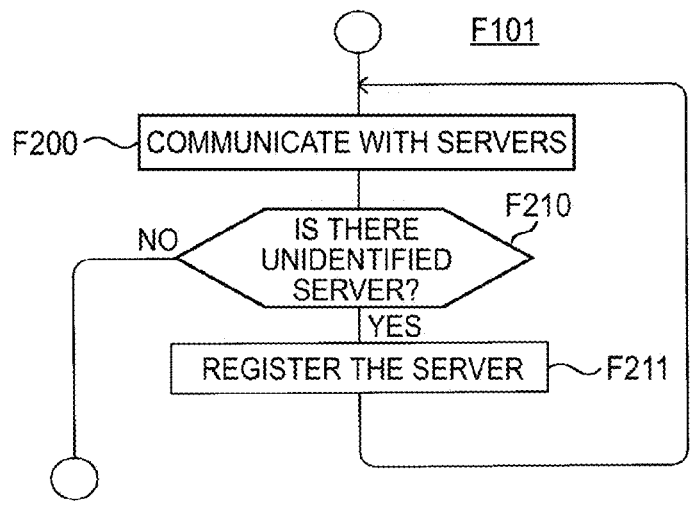

Although the process shown in FIG. 7A has been described as the server authentication process at step F101 in FIG. 6, the process shown in FIG. 7B may alternatively be performed at step F101.

Specifically, when the presence of an unidentified management server apparatus 2 is recognized as a result of communication at step F200, the control section 21 proceeds from step F210 to F211 to register the server as a server to be accommodated in the network system.

The process accommodates a management server apparatus 2 in the network system regardless of the management structure of the same as long as communication can be established with the apparatus 2.

In such a case, a management server 2 selected at step F103 in FIG. 6 may have a management structure including management items which cannot be recognized by a client apparatus 5, for example, as shown in FIG. 8B.

Even when the control section 21 cannot recognize the meanings of the management items "A", "B", "C" and "D", the control section can select any of the management items.

Therefore, an arbitrary management item can be selected, and information on a contents list included in the management item can be requested. For example, the control section can select the management item "A" in FIG. 8B and can request the contents list information shown on the right side of FIG. 8B. That is, the series of processes at steps F104 to F110 can be carried out. Therefore, the network system may accommodate even a management server apparatus 2 having a management structure that the control section 21 is not supposed to handle.

As a modification to the processes at steps F104 to F107 shown in FIG. 6, a selected management server apparatus 2 may be requested to provide management item information and contents list information simultaneously.

The control section 21 receives the management item information along with information on a contents list included in the management item and selects an item of content data based on the pieces of information at step F109.

That is, the processes of selecting a management item, referring to contents list information, and selecting an item of content data can be carried out through one cycle of communication.

Thus, the processes can be carried out at improved efficiency.

While a client apparatus 5 of the present embodiment includes the power supply key 27a and the reproduction key 27b, it may alternatively have the power supply key 27a only.

In response to an operation on the power supply key 27a, the control section 21 may perform the server authentication process at step F101 in FIG. 6 and may immediately perform the processes at step F103 and subsequent steps thereafter.

The user can enjoy an item of distributed content reproduced and output from the client apparatus 5 only by turning the power supply of the client apparatus 5 on. Thus, very little operational burden is paced on the user.

<6. Program>

The processes in FIG. 6 involved in the embodiment of the invention and the processes in the modification of the embodiment described above may be provided in the form of a program for causing an arithmetic processing unit such as a CPU to perform them.

A program for causing an arithmetic processing unit to perform the processes shown in FIG. 6 allows a client apparatus 5 having the above-described advantages to be provided easily.

For example, a client apparatus 5 placing very little operational burden on a user can be provided using a personal computer.

Such a program may be recorded in advance in an HDD as a recording medium incorporated in a personal computer or a reproduction apparatus or in a ROM of a microcomputer including a CPU.

Alternatively, such a program may be temporarily or permanently stored (recorded) in a removable recording medium such as a flexible disc, a CD-ROM (compact disc read only memory), an MO (magneto-optical) disc, a DVD (digital versatile disc), a Blu-ray disc (registered trademark), a magnetic disc, a semiconductor memory, or a memory card. Such a removable recording medium may be provided as what is called package software.

A program according to the embodiment of the invention may be installed in a personal computer or the like from a removable recording medium. Alternatively, the program may be downloaded from a download site through a network such as a LAN (local area network) or the internet.

The present application contains subject matter related to that disclosed in Japanese Priority Patent Application JP 2010-051739 filed in the Japan Patent Office on Mar. 9, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A network terminal apparatus comprising:
   at least one processor; and
   at least one storage medium having encoded thereon processor-executable instructions that, when executed by the at least one processor, cause the at least one processor to act as:
      a communication section to communicate with a first server apparatus via at least one network;
      a reproduction section to reproduce and output content data;
      a request processing section to perform:
         a management structure requesting process for requesting that the first server apparatus provide management structure information indicating a management structure for content, the management structure identifying a classification of the content,
         a content selecting process for selecting an item of content data of the content based at least in part on the management structure information, the content selecting process causing the at least one processor to select the item of content data without input from a user regarding the selection, and
         a content requesting process for requesting that a second server apparatus identified by the management structure information distribute the item of content data selected by the content selecting; and
      a reproduction controlling section to cause the reproduction section to reproduce the item of content data received from the second server apparatus
   wherein:
      the request processing section further performs a server selecting process for selecting the first server apparatus without input from the user and executes the management structure requesting process for the first server apparatus selected by the server selecting process,
      the at least one storage medium further stores executable instructions that, when executed by the at least one processor, cause the at least one processor to act as an operation section to perform an operation of turning on a power supply or starting a reproducing operation, and
      the request processing section executes the server selecting process, the content selecting process, and the content requesting process without input from the user in response to the operation of turning on the power supply or starting the reproducing operation performed by the operation section.

2. A network terminal apparatus according to claim 1, wherein the request processing section selects, in the server selecting process, a first server apparatus that provides management structure information including recognizable management items.

3. A network terminal apparatus according to claim 1, wherein the request processing section, in performing the content selecting process:
   selects, without input from the user, a management item identified by the management structure information,
   acquires contents list information indicating content data included in the selected management item, and
   selects, without input from the user, the item of content data from the contents list information.

4. A network terminal apparatus according to claim 3, wherein the request processing section performs a process of acquiring the contents list information by requesting that the first server apparatus provide a contents list.

5. A network terminal apparatus according to claim 3, wherein, following a start of reproduction of the item of content data, the request processing section subsequently performs the content selecting process for selecting a new item of content data based at least in part on the contents list information used in the content selecting process and subsequently performs the content requesting process for requesting that the second server apparatus distribute the new item of content data.

6. A network terminal apparatus according to claim 1, wherein, a start of reproduction of the item of content data, the request processing section subsequently performs the content selecting process for selecting a new item of content data based at least in part on management structure information used in the content selecting process and subsequently performs the content requesting process for requesting that the second server apparatus distribute the new item of content data.

7. A network terminal apparatus according to claim 1, wherein, following a start of reproduction of the item of content data, the request processing section subsequently performs the management structure requesting process to request new management structure information, the content selecting process to select a new item of content data based at least in part on new management structure information, and the content requesting process for requesting that the second server apparatus distribute the new item of content data.

8. A network terminal apparatus according to claim 1, wherein, following a start of reproduction of the item of content data, the request processing section subsequently newly performs the server selecting process, the management structure requesting process, and the content selecting process to select a new item of content data for reproduction and subsequently performs the content requesting process for requesting that the second server apparatus distribute the new item of content data.

9. A network terminal apparatus according to claim 1, wherein the at least one storage medium further stores executable instructions that, when executed by the at least one processor, cause the at least one processor to act as a registration managing section to register at least distributor information included in an item of content data being reproduced by the reproduction section in a registration list, according to an operation performed by a user,
    wherein the request processing section can perform a content requesting process for requesting a second server apparatus indicated by the distributor information to distribute the item of content data selected using the registration list.

10. A distribution requesting method for use by a network terminal apparatus, the network terminal apparatus including a communication section to communicate with a first server apparatus via at least one network and a reproduction section to reproduce content data, the method comprising:
    performing an operation of turning on a power supply or starting a reproducing operation; and
    in response to the operation, and without input from a user, selecting the first server apparatus;
        requesting that the first server apparatus provide management structure information indicating a management structure for content, the management structure identifying a classification of the content;
        selecting an item of content data based at least in part on the management structure information, the item of content data being selected without input from the user regarding the selection; and
        requesting that a second server apparatus identified as a distributor by the management structure information distribute the item of content data.

11. The distribution requesting method of claim 10, wherein the first server apparatus and the second server apparatus are the same server apparatus.

12. The network terminal apparatus of claim 1, wherein the first server apparatus and the second server apparatus are the same server apparatus.

\* \* \* \* \*